(12) United States Patent
Biehler et al.

(10) Patent No.: US 7,706,898 B2
(45) Date of Patent: Apr. 27, 2010

(54) USE OF VARIABLES IN A NUMBER OF AUTOMATION SYSTEMS

(75) Inventors: Georg Biehler, Nürnberg (DE); Wolfgang Füßlein, Essingen (DE); Lothar Trapp, Feucht (DE)

(73) Assignee: Siemens Aktiengesellschaft, Munich (DE)

( * ) Notice: Subject to any disclaimer, the term of this patent is extended or adjusted under 35 U.S.C. 154(b) by 302 days.

(21) Appl. No.: 11/707,197

(22) Filed: Feb. 13, 2007

(65) Prior Publication Data

US 2007/0198736 A1 Aug. 23, 2007

(30) Foreign Application Priority Data

Feb. 17, 2006 (EP) .................................. 06003296

(51) Int. Cl.
G05B 13/02 (2006.01)
G06F 3/00 (2006.01)
G06F 9/44 (2006.01)
G05B 21/02 (2006.01)

(52) U.S. Cl. .................. 700/34; 719/328; 719/313; 700/73; 700/74

(58) Field of Classification Search .................. 700/34, 700/73, 74; 719/328, 313
See application file for complete search history.

(56) References Cited

U.S. PATENT DOCUMENTS

| | | | |
|---|---|---|---|
| 6,201,996 B1 | 3/2001 | Crater et al. | |
| 6,349,343 B1* | 2/2002 | Foody et al. | 719/316 |
| 2002/0016815 A1 | 2/2002 | Hardy et al. | |
| 2002/0095521 A1* | 7/2002 | Blaukopf et al. | 709/310 |
| 2003/0009572 A1 | 1/2003 | Thurner | |
| 2005/0256894 A1 | 11/2005 | Talanis et al. | |
| 2006/0064673 A1* | 3/2006 | Rogers et al. | 717/113 |

* cited by examiner

*Primary Examiner*—Ramesh B Patel
*Assistant Examiner*—Sivalingam Sivanesan

(57) ABSTRACT

There is described a method and system for using at least one variable of a first automation system in a second automation system, with the variable being made available by the first automation system. An object is to allow a user to program access to a local and remote variable in an identical manner, without having to program special access functions, set up connections and apply a local variable to take up the variable value or to create additional assignment tables and similarly apply the local variable. This object is achieved with a method and system of the type mentioned above, in that an identification feature is used for the unique identification of the variable in the at least second automation system, said identification feature being hierarchically structured and having a system-specific path name and a name for the variable.

19 Claims, 1 Drawing Sheet

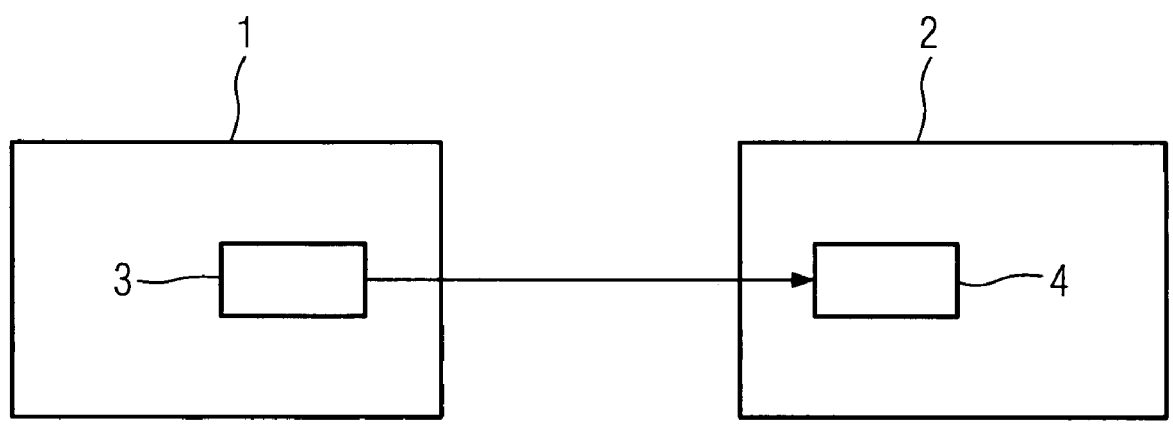

USE OF VARIABLES IN A NUMBER OF AUTOMATION SYSTEMS

CROSS REFERENCE TO RELATED APPLICATIONS

This application claims priority of European application No. 06003296.8 EP filed Feb. 17, 2006, which is incorporated by reference herein in its entirety.

FIELD OF INVENTION

The invention relates to a method and system for using at least one variable of a first automation system in a second automation system, with the variable being made available by the first automation system.

BACKGROUND OF INVENTION

Such a method and system are used in particular in the field of plant automation, wherein a number of automation systems are generally used to control a plant. One important sub-aspect here is the use of variables of one automation system in another automation system. The variables, which are used by other communication partners, have to be made available by the system holding the originals of the variables.

Fundamentally different methods are currently used for—read or even write—access from one automation system to a variable of another automation system. Special access functions, for example the function modules according to IEC 61131-5 or the system functions "GET/PUT" of the SIMATIC S7, are therefore used. These access functions differentiate based on reading and writing the variables and require the configuration of a connection between the two automation systems, which then, has to be indicated at the access functions, or at least the identification of the automation system containing the variables. Also the name or address of the variables must be specified to the access functions and a local variable must be established and indicated at the access function, which is to assume the value of the variable. By calling up the access function the variable thus identified is read or written and the value is made available to the program or taken over by it.

Alternatively a table-based method for the exchange of variable values is for example integrated in the SIMATIC S7 system. To this end the automation systems, which wish to exchange variable values, are inserted into the table as columns. The identification—name or address—of the variables, which are to have the same value, is then input in the respective rows. One cell of each row of the table is identified as a transmit variable, in other words the value of said variable is transmitted to the other variables shown in the same row.

These existing methods are characterized in that from a user's point of view additional methods have to be used for access to variable values of another automation system, compared with access to local variables.

SUMMARY OF INVENTION

An object of the invention is to specify a method and system, with which the user can program access to a local variable and a variable of another automation system in an identical manner.

This object is achieved with a method and system of the type mentioned above, in that an identification feature is used for unique identification of the variable in the at least second automation system, said identification feature being structured hierarchically and having a system-specific path name and a name for the variable.

This means that from the programming point of view the user accesses a variable of another automation system in the same manner as a local variable. There is no need to program special access functions, set up connections and apply a local variable to take up the variable value or to create additional assignment tables and similarly apply the local variable.

In one advantageous embodiment the individual components of the identification feature are separated from each other by a separating feature. This separating feature can be a slash for example, thereby increasing the readability of the identification feature.

In a further advantageous embodiment a user selects the variable in a program editor from a list of variables and the program editor automatically creates the identification feature. The user therefore does not have to worry about the automation system where the original of the variable is located, as the program editor adds to the system-specific path name automatically.

In a further advantageous embodiment a user indicates the identification feature of the variable directly in a program editor and said user is always offered an up to date selection of the identification features which correspond to the identification feature input to date. This method, also referred to as "autocompletion" provides user-friendly support for users during programming.

In a further advantageous embodiment a proxy variable is applied in the second automation system, being of the same data type and containing the same value as the variable of the first automation system identified by the identification feature. Internal use of the local proxy variable allows access to the variable value to be configured as efficiently as access to a local variable.

In a further advantageous embodiment the proxy variable is updated cyclically. The system makes this cyclically updated value of the remote variable available in the local program, so that it does not first have to read the variable from the remote automation system during processing.

In a further advantageous embodiment, if an error occurs during a first access by the second automation system to the first automation system, an initial value of the proxy variable is used, which can be configured specifically. This ensures that the automation system can continue to operate with a significant initial value for the proxy variable, even if an error occurs when accessing the remote automation system.

In a further advantageous embodiment, if an error occurs during a further access than the first access by the second automation system to the first automation system, the last value of the proxy variable is retained as the current value. This similarly ensures that the second automation system can continue to operate with a significant value for the proxy variable, if an error occurs when accessing the remote automation system.

In a further advantageous embodiment, if an error occurs during access by the second automation systems to the first automation system, an error event of a second automation system is initiated, causing specific algorithms for an adequate response to the access error to be executed in a user program. These are for example the displaying of the access error, the initiation of an error event or the provision of a substitute value for the proxy variable calculated by the second automation system.

In a further advantageous embodiment all technically suitable variables are made available by the first automation system. This means that technically unsuitable variables are hidden, in other words no temporary variables or pointers are made available for example. This allows concentration on the essential and ensures clarity amid the large number of variables in a plant. Limiting the variables also contributes to the necessary conservation of resources.

In a further advantageous embodiment the first automation system makes available all the variables, which have a characteristic specified by a user. For example the variables of the parameter interface (input and/or output) are offered as such variables from the function block. In another example only those variables having specific characteristics, such as HMI-(Human Machine Interface) relevant or MES-(Manufacturing Execution System) relevant attributes, should be automatically available.

In a further advantageous embodiment the variable of the first automation system, which is accessed from the second automation system, is only made available further to this request. This allows the user specifically to access a variable from a remote communication partner, which had not hitherto been made available.

In a further advantageous embodiment the quantity of available variables is limited by a user. This means that the scope of the variables cannot be extended without the permission of the creator of the user program for the variables. The user can thus prevent variables being made available which should not or ought not be made available, because the user or manufacturer of part of the automation solution does not want this, for example to protect their know-how.

BRIEF DESCRIPTION OF THE DRAWING

The invention is described in more detail below with reference to the exemplary embodiment shown in the sole FIGURE, in which:

FIG. 1 shows a schematic diagram of two automation systems, using the same variable.

DETAILED DESCRIPTION OF INVENTION

FIG. 1 shows a schematic diagram of a first automation system 1 and a second automation system 2, with a variable 3 being made available for use in the second automation system 2. To simplify use of the variable 3 in the second automation system 2, so that it is not necessary to access the remote automation system 1 every time the variable 3 is requested, a proxy variable 4 is established in the second automation system 2. This proxy variable 4 is allocated an initial value or the last current value, if an error occurs during access by the second automation system 2 to the first automation system 1, depending on whether the access error occurred during the first access or a later access.

To summarize, the invention relates to a method and system for using at least one variable of a first automation system in at least a second automation system, with the variable being made available by the first automation system. The object of the invention is to allow a user to program access to a local and remote variable in an identical manner, without having to program special access functions, set up connections and apply a local variable to take up the variable value or to create additional assignment tables and similarly apply the local variable. This object is achieved with a method and system of the type mentioned above, in that an identification feature is used for the unique identification of the variable in the at least second automation system, said identification feature being hierarchically structured and having a system-specific path name and a name for the variable. This means that the user does not have to worry about updating the variable and there is not need to call up any access functions for example. This method also means that the user has a much smaller configuration outlay and greater program clarity, as it is clear immediately which variable is being accessed.

The invention claimed is:

1. A method for accessing variables on different automation systems, the method comprising:
   configuring a plurality of automation systems to control a plant, wherein the plurality of automation systems comprises at least a first automation system and a second automation system, wherein the first automation system comprises a different automation system relative to the second automation system;
   using a variable of the first automation system in the second automation system;
   making the variable available by the first automation system to the second automation system; and
   using an hierarchically structured identification feature having a system-specific path name and a variable name in order to a uniquely identify the variable within the second automation system, wherein the hierarchically structured identification feature is configured so that the variable of the first automation system is accessed by the second automation system as a local variable of the second system.

2. The method as claimed in claim 1, wherein the identification feature has individual components which are separated from each other by a separating feature.

3. The method as claimed in claim 2, wherein a user selects the variable in a program editor from a list of variables and the program editor automatically creates the identification feature.

4. The method as claimed in claim 3, wherein the identification feature of the variable is inputted into a program editor by a user and the user is always offered an up to date selection of the identification features, the identification feature is corresponding to the identification feature input to date.

5. The method as claimed in claim 2, wherein the variable of the first automation system is accessible from the second automation system only by a request made by the second automation system.

6. The method as claimed in claim 5, wherein the quantity of variables made available in the first automation system is limited by a user.

7. The method as claimed in claim 1, wherein a proxy variable is applied in the second automation system, the proxy variable having the same data type and having the same value as the variable of the first automation system identified by the identification feature.

8. The method as claimed in claim 7, wherein the proxy variable is cyclically updated.

9. The method as claimed in claim 8, wherein an configured initial value of the proxy variable is used, if an error occurs during a first access by the second automation system to the first automation system.

10. The method as claimed in claim 8, wherein the last value of the proxy variable is retained as the current value, if an error occurs during a further access than the first access by the second automation system to the first automation system.

11. The method as claimed in claim 7, wherein an error event in the second automation system is initiated, if an error occurs during access by the second automation system to the first automation system, wherein a specific algorithms for a response to the access error is executed in a user program.

12. The method as claimed in claim 11, wherein the first automation system makes all variables available to the second automation system having a characteristic specified by a user.

13. A plant, comprising:

a plurality of automation systems configured to control the plant, wherein the plurality of automation systems comprises at least a first automation system and a second automation system, wherein the first automation system is a different automation system relative to the second automation system;

the first automation systems having a variable, wherein the second automation system uses the variable of the first automation system; and an hierarchical structured identification feature for a unique identification of the variable in the second automation system, wherein a system-specific path name and a variable name is used as individual components for the hierarchical structure, wherein the hierarchically structured identification feature is configured so that the variable of the first automation system is accessed by the second automation system as a local variable of the second system.

14. The automation system as claimed in claim 13, wherein a separating feature separates the individual components from each other.

15. The automation system as claimed in claim 14, wherein the second automation system has a program editor to select the variable by a user from a list of variables.

16. The automation system as claimed in claim 15, wherein the second automation system has a program editor to input the identification feature of the variable by a user, wherein the program editor offers a selection and an actual display of identification features, which correspond to the identification feature input made by the user.

17. The automation system as claimed in claim 15, wherein the variable has a data type and a value and the second automation system has the variable of the same data type and with the same value as the variable of the first automation systems identified by the identification feature, wherein the proxy variable is cyclical updated.

18. The automation system as claimed in claim 17, wherein a configurable initial value of the proxy variable is provided, if an error occurs during a first access by the second automation systems to the first automation system, wherein the last value of the proxy variable is used as a current value, if an error occurs during a further access than the first access by the second automation system to the first automation system.

19. The automation system as claimed in claim 18, wherein an error event is initiated in a user program of the second automation system, causing an execution of specific algorithms in a user program to respond to the error, if an error occurs during access by the second automation system to the first automation system.

\* \* \* \* \*